US010237660B2

(12) United States Patent
McBroom et al.

(10) Patent No.: US 10,237,660 B2
(45) Date of Patent: Mar. 19, 2019

(54) ONE PIECE FRAME FOR A COMPONENT IN AN ELECTRONIC DEVICE

(71) Applicant: Apple Inc., Cupertino, CA (US)

(72) Inventors: Michael D. McBroom, Leander, TX (US); Bartley K. Andre, Menlo Park, CA (US); Mikael M. Silvanto, San Francisco, CA (US); Matthew A. Donarski, San Francisco, CA (US); Alexander V. Salvatti, Morgan Hill, CA (US); Daniel K. Boothe, San Francisco, CA (US); Ryan J. Mihelich, Morgan Hill, CA (US); Sabrina K. Paseman, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 152 days.

(21) Appl. No.: 15/072,312

(22) Filed: Mar. 16, 2016

(65) Prior Publication Data

US 2016/0277819 A1    Sep. 22, 2016

Related U.S. Application Data

(60) Provisional application No. 62/136,409, filed on Mar. 20, 2015, provisional application No. 62/138,339, filed on Mar. 25, 2015.

(51) Int. Cl.
*H04R 9/06* (2006.01)
*H04R 9/02* (2006.01)
(Continued)

(52) U.S. Cl.
CPC .............. *H04R 9/06* (2013.01); *G06F 1/16* (2013.01); *G06F 1/20* (2013.01); *H04R 1/02* (2013.01);
(Continued)

(58) Field of Classification Search
CPC ... H04R 9/06; H04R 1/02; H04R 1/34; H04R 9/02; H04R 2499/15; H04R 2201/029;
(Continued)

(56) References Cited

U.S. PATENT DOCUMENTS 5,313,362 A * 5/1994 Hatada ................... G06F 1/203
165/80.3
5,969,940 A * 10/1999 Sano ..................... G06F 1/1616
361/679.52
(Continued)

FOREIGN PATENT DOCUMENTS

CN    202281971 U    6/2012
CN    203444394 U    2/2014
(Continued)

OTHER PUBLICATIONS

PCT/US2016/021839 , "International Search Report and Written Opinion", dated Jul. 29, 2016, 24 pages.

*Primary Examiner* — Oyesola C Ojo
(74) *Attorney, Agent, or Firm* — Kilpatrick Townsend & Stockton LLP

(57) ABSTRACT

An electronic device including a frame member suitable for use with an audio driver is disclosed. The frame member may include a recessed region that receives the audio driver. The frame member may further include a flange member surrounding the recessed region. The frame member may be formed from a material having a relatively high coefficient of thermal conductivity. Accordingly, the frame member can dissipate thermal energy (heat) generated from the audio driver. In addition, the frame member may be seated in an enclosure of an electronic device in a manner that allows the frame member to pass the thermal energy to the enclosure. Also, the frame member may include a ferromagnetic mate- (Continued)

rial, which may cause the frame member to direct magnetic flux from a magnet of the audio driver in a desired manner.

18 Claims, 7 Drawing Sheets

(51) Int. Cl.
| | |
|---|---|
| *G06F 1/16* | (2006.01) |
| *G06F 1/20* | (2006.01) |
| *H04R 1/34* | (2006.01) |
| *H04R 1/02* | (2006.01) |

(52) U.S. Cl.
CPC .............. *H04R 1/34* (2013.01); *H04R 9/02* (2013.01); *H04R 2201/029* (2013.01); *H04R 2209/022* (2013.01); *H04R 2400/11* (2013.01); *H04R 2499/15* (2013.01)

(58) Field of Classification Search
CPC . H04R 2209/022; H04R 2400/11; G06F 1/20; G06F 1/16; G06F 1/203; G06F 1/206; F28D 2021/0028; F28D 2021/0029; F28F 3/02; F28F 3/027; H05K 7/20154
See application file for complete search history.

(56) References Cited

U.S. PATENT DOCUMENTS

| | | | | |
|---|---|---|---|---|
| 6,449,149 | B1* | 9/2002 | Ohashi | G06F 1/203 165/104.33 |
| 6,469,892 | B2* | 10/2002 | Ueda | G06F 1/20 165/104.33 |
| 6,507,493 | B2* | 1/2003 | Ueda | G06F 1/20 165/185 |
| 6,774,510 | B1* | 8/2004 | Moro | H02K 41/0356 310/12.24 |
| 7,940,951 | B2* | 5/2011 | Chen | G06F 1/203 381/124 |
| 8,561,756 | B2* | 10/2013 | Litovsky | H04R 1/02 181/198 |
| 9,134,757 | B2* | 9/2015 | Nishi | G06F 1/203 |
| 2002/0018335 | A1* | 2/2002 | Koizumi | G06F 1/1632 361/679.47 |
| 2008/0056527 | A1* | 3/2008 | Adamson | H04R 9/022 381/409 |
| 2008/0075317 | A1* | 3/2008 | Chen | G06F 1/203 381/397 |
| 2009/0262491 | A1* | 10/2009 | Yamaguchi | G06F 1/1616 361/679.4 |
| 2011/0085694 | A1* | 4/2011 | Lee | H04R 9/022 381/397 |
| 2013/0058513 | A1* | 3/2013 | Miyamoto | H04R 1/02 381/333 |
| 2013/0213730 | A1* | 8/2013 | Litovsky | H04R 1/02 181/199 |
| 2013/0259284 | A1 | 10/2013 | Shi et al. | |
| 2014/0044300 | A1* | 2/2014 | Osada | H04R 1/02 381/387 |
| 2014/0294219 | A1 | 10/2014 | Powell et al. | |
| 2016/0086458 | A1* | 3/2016 | Biggs | G08B 6/00 381/151 |

FOREIGN PATENT DOCUMENTS

| | | | | |
|---|---|---|---|---|
| JP | 2005295335 A | * | 10/2005 | .............. H04R 1/02 |
| KR | 1020130111132 | | 10/2013 | |

* cited by examiner

ONE PIECE FRAME FOR A COMPONENT IN AN ELECTRONIC DEVICE

CROSS-REFERENCE TO RELATED APPLICATION(S)

This application claims the benefit of priority under 35 U.S.C. § 119(e) to i) U.S. Provisional Application No. 62/136,409, filed on Mar. 20, 2015, and titled "ONE PIECE SPEAKER YOKE ENCLOSURE," and ii) U.S. Provisional Application No. 62/138,339, filed on Mar. 25, 2015, and titled "ONE PIECE SPEAKER YOKE ENCLOSURE," the disclosure of each is incorporated herein by reference in its entirety.

FIELD

The described embodiments relate generally to electronic devices having audio components. In particular, the present embodiments relate to an apparatus and method for dissipating heat and enhancing acoustical performance of the audio components.

BACKGROUND

Audio drivers, commonly referred to as speakers or speaker modules, are known to create sound by actuating a voice coil, which can be accomplished by passing electrical current through the voice coil such that the voice coil becomes an electromagnet. Further, the electrical current can be driven in opposite directions, creating an electromagnet that changes magnetic polarity. The electromagnet is attracted to the permanent magnet (when the electromagnet includes the opposite polarity as that of the permanent magnet) and alternatively repelled by the permanent magnet (when the electromagnet includes the same polarity as that of the permanent magnet). Based on the flow of electrical current, the voice coil may actuate.

However, some of the electrical energy input into the audio driver in the form of electrical current is converted to thermal energy. As the thermal energy increases, the performance (sound quality) of the audio driver decreases, particularly when the audio driver is enclosed. For example, an audio driver enclosed in a metal enclosure of a portable electronic device may generate heat under continuous use causing the resistance of the voice coil to increase. As a result, the amount of electrical current delivered to the voice coil is reduced. This not only reduces performance of the audio driver but also reduces efficiency. Regarding the latter, additional electrical current may be required to regain the performance, but this can draw additional electrical power stored in a battery of the portable electronic device.

One method for offsetting these undesired effects is to provide an audio driver with a specialized magnet having a relatively high thermal capacity and configured to absorb the additional heat. However, these specialized magnets are generally more expensive than traditional magnets. Accordingly, additional costs associated with these specialized magnets increase the overall cost of the portable electronic device.

SUMMARY

In one aspect, a frame member formed from a metal and suitable for carrying an internal component disposed in an enclosure of an electronic device is described. The frame member may include a recessed region capable of receiving the internal component. The frame member may further include a flange member extending from recessed region and engaging the enclosure. The frame member may further include a curved region extending from the recessed region and aligning with an opening of the enclosure. In some embodiments, the flange member receives heat generated by the internal component and passes the heat to the enclosure.

In another aspect, an electronic device is described. The electronic device may include an enclosure. The electronic device may further include an audio driver assembly. The electronic device may further include a frame member for receiving the audio driver assembly. The frame member may define a thermal bridge configured to dissipate heat generated from the audio driver assembly and pass the heat the enclosure. The frame member may include a substrate that includes a recessed region capable of receiving the audio driver assembly. The frame member may further include a flange member formed from the substrate and extending from recessed region. The flange member may receive the heat generated by the audio driver assembly and pass the heat to the enclosure.

In another aspect, an electronic device is described. The electronic device may include an enclosure. The electronic device may further include an audio driver assembly that includes a magnet and a voice coil. The electronic device may further include a frame member for receiving the audio driver assembly. The frame member may include a metal substrate that 1) dissipates heat received by the audio driver assembly to the enclosure, and 2) redirects magnetic flux from the magnet to the voice coil.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which.

Figure 1:
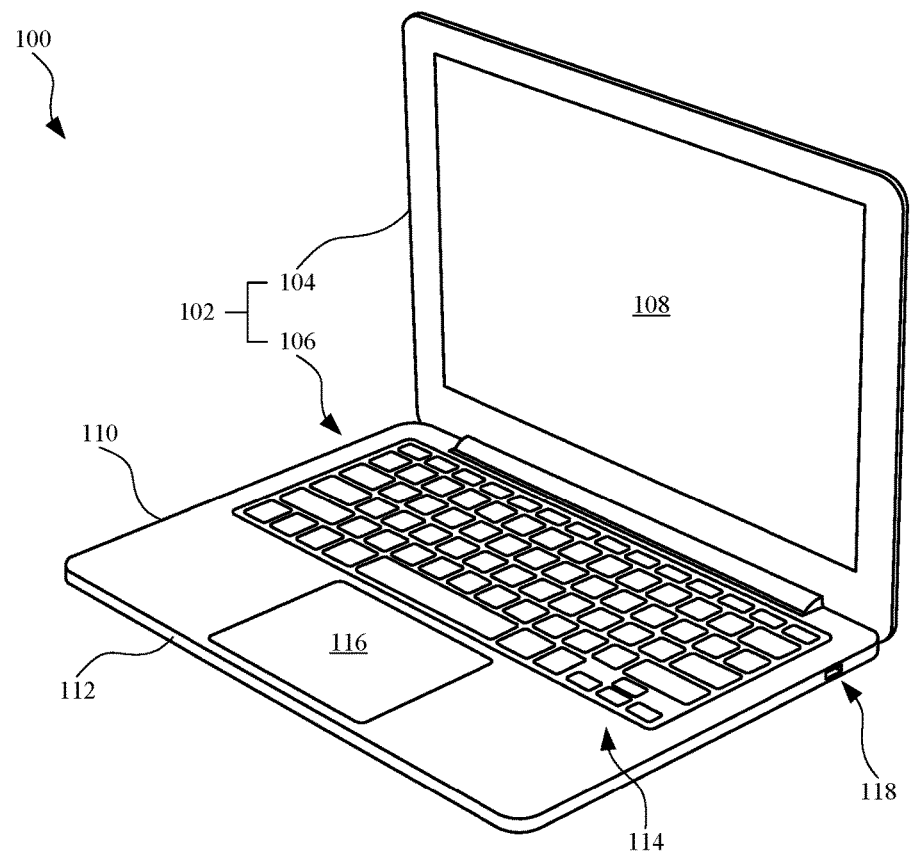
FIG. 1 illustrates an isometric view of an embodiment of an electronic device in an open configuration, in accordance with the described embodiments.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments may be used, and changes may be made without departing from the spirit and scope of the described embodiments.

The present disclosure includes an electronic device, such as a laptop computer device, that includes several modifications to improve acoustical performance of the electronic device. The electronic device may include one or more audio driver assemblies, or speaker assemblies, that emit acoustical energy in the form of audible sound. A frame member, or yoke, may be designed to receive and carry an audio driver assembly. In this regard, multiple frame members may be used, with each frame member carrying an audio driver assembly.

The frame members in the present disclosure may enhance acoustical performance through multiple means. For example, the frame member in the present disclosure may be formed from a metal having a relatively high thermal conductivity, such as steel, stainless steel or the like. Further, the frame member may couple with an enclosure, or housing, of an electronic device form a metal, such as aluminum or aluminum alloy. In some cases, the enclosure is a unibody enclosure. The term "unibody" as used throughout this detailed description and in the claims refers to a structure formed from a single and continuous piece or substrate. In order to form a unibody structure, in some cases, the single and continuous piece or substrate may undergo a subtractive manufacturing process to remove material, thereby defining various features of the unibody structure. The frame member may also include a unibody structure. In this manner, the frame member, when carrying the audio driver assembly, the frame member may thermally couple with an audio driver assembly and act as a thermal bridge to efficiently dissipate heat from the audio driver assembly to the enclosure.

The frame member may include a recessed region used to receive the audio driver assembly. Also, the frame member may further include a flange member surrounding and extending from the recessed region. Further, the flange member may extend to one or more sidewalls of the enclosure. The audio driver assembly, when positioned in the frame member, may emit acoustical energy (in the form of audible sound) through an acoustic duct, or acoustic pathway, formed in part by the enclosure and the frame member. For example, the frame member may include a curved region that forms at least part of the acoustic duct for the audio driver assembly. The curved region may include not only a size and a shape that enhances the acoustic duct, but also aligns with an opening of the enclosure thereby allowing acoustical energy emitted from the audio driver assembly to exit the electronic device (via the opening).

Traditional electronic devices may include multiple openings having separate and independent functions. For example, a traditional electronic device may include an opening (or openings) for heat dissipation, as well as a separate and independent opening (or openings) to allow an audio speaker to emit sound. However, in the present embodiments, the electronic device may include an opening (or openings) at a predetermined location (or locations) of the enclosure that may function as both a thermal vent and an acoustical opening. Accordingly, the electronic device may include fewer openings, which may not only decrease manufacturing times but also reduces the likelihood of ingress of contaminants (such as dust or liquid).

A metal frame member described in the present embodiments offers several advantages over frame members that include non-metal materials. For example, a frame member made from plastic or other polymeric materials cannot transfer heat in the same manner as a metal frame member, due in part to metal having a greater thermal conductivity than that of plastic or polymeric materials. Further, a plastic frame member may be more susceptible to breaking or cracking during assembly of the electronic device, due in part to the relatively low durability of plastic as compared to metal. Also, the plastic frame member may also be more susceptible to breaking or cracking when the electronic device (that carries the plastic frame member) is dropped by, for example, a user of the electronic device. In addition, creating the frame member from certain metals such as steel, iron, iron-cobalt, etc., provides the frame member with ferromagnetic characteristics that may enhance the performance of an audio driver assembly. For example, a frame member formed from a ferromagnetic material may provide a combination of enhanced heat dissipation for audio driver assembly components (such as a voice coil), as well as a relatively low reluctance magnetic flux path. Also, the audio driver assembly may include one or more magnets. Magnets are known to be sensitive to heat in that magnets may reduce in magnetization in response to heat. However, by dissipating heat from the audio driver assembly, the frame member may allow the magnets to maintain (or at least substantially maintain) their magnetization during operation of the audio driver assembly. Also, while the frame member shown and described herein may be designed to receive an audio driver assembly, the frame member can be designed to receive other internal, heat-generating components such as a battery or a processor. Accordingly, the frame member may be modified in size and/or shape to accommodate various internal, heat-generating components.

These and other embodiments are discussed below with reference to FIGS. 1-14. However, those skilled in the art will readily appreciate that the detailed description given herein with respect to these Figures is for explanatory purposes only and should not be construed as limiting.

FIG. 1 illustrates an isometric view of an embodiment of an electronic device 100 in an open configuration, in accordance with the described embodiments. In some embodiments, the electronic device 100 is a desktop computing device. In other embodiments, the electronic device 100 is a wireless mobile communication device, such as a smartphone. In the embodiment shown in FIG. 1, the electronic device 100 is a portable computing device, such as a laptop computer device. As shown, the electronic device 100 includes an enclosure 102. The enclosure 102 may include a display housing 104 coupled with a base portion 106, with the coupling means allowing the display housing 104 to rotate or pivot with respect to the base portion 106, and vice versa. In some embodiments, the display housing 104 and the base portion 106 are formed from a metal, such as aluminum or aluminum alloy.

The display housing 104 may include a display assembly 108 designed to display visual content in the form of video and/or still images, as non-limiting examples. The display assembly 108 may be electrically coupled with one or more components (not shown) disposed in the base portion 106, such as a battery and a processor circuit. The base portion 106 may include a top case 110 and a bottom case (not shown) coupled with the top case 110. In some embodiments, the top case 110 and/or the bottom case are formed from a unibody construction that include one or more features formed from a single substrate. For example, the top case 110 may include one or more sidewalls, such as a sidewall 112, formed during a material removal process of the top case 110. This will be discussed below. The base portion 106 may further include a keyboard 114 and a touch pad 116, both of which are known in the art to provide commands in the form of an input or gesture, respectively, to the electronic device 100. Also, the electronic device 100 may include a port 118 designed to send and receive data, and/or receive power from an external power source.

Figure 2:
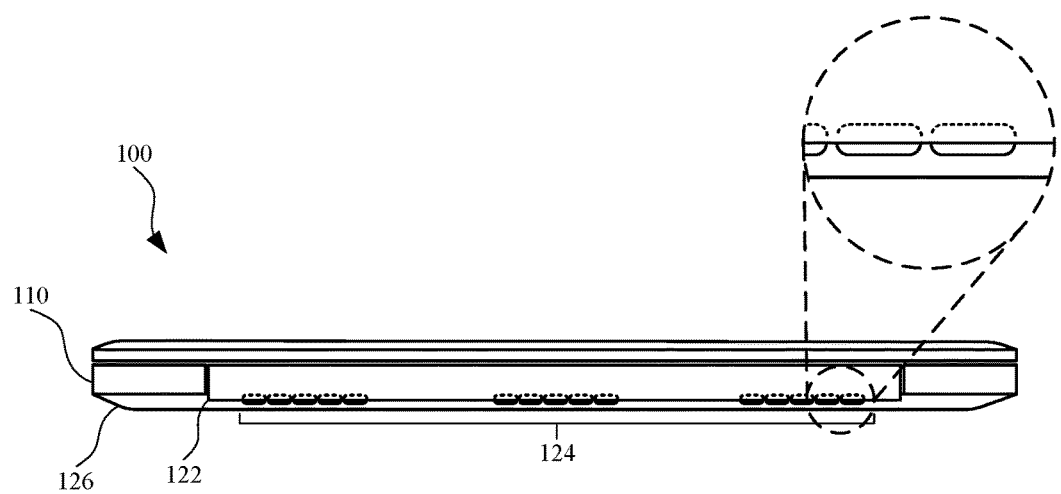
FIG. 2 illustrates a rear view of the electronic device shown in FIG. 1, showing the electronic device in a closed configuration.

FIG. 2 illustrates a rear view of the electronic device 100 shown in FIG. 1, with the electronic device 100 in a closed configuration. As shown, the electronic device 100 may include a cover 122 designed to cover internal components of the electronic device 100, such as a clutch assembly (not shown) used to rotate the display housing 104 with respect to the base portion 106. Also, the top case 110 may combine with a bottom case 126 to define the base portion 106 (shown in FIG. 1). The cover 122 may at least partially cover, or hide from view, openings 124 (shown as dotted lines) that may be used by the electronic device 100 to allow heat generated from internal components to exit the electronic device 100. In some embodiments, the cover 122 includes plastic. The top case 110 and the bottom case 126 may be designed to reveal the openings 124 disposed behind the cover 122. However, in some embodiments (not shown), the openings 124 are fully covered by the cover 122. In addition to allowing heat dissipation, the openings 124 may also allow acoustical energy in the form of audible sound to pass through the openings 124. This will be discussed below.

Figure 3:
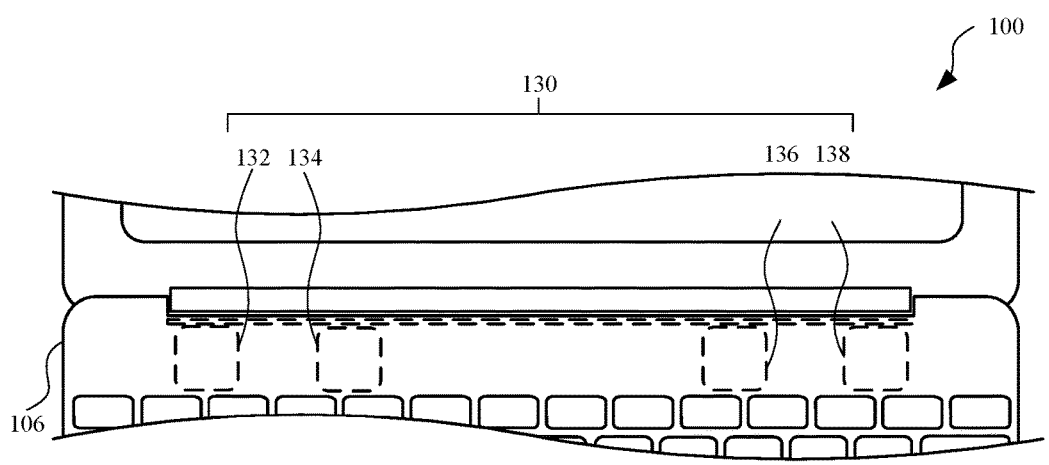
FIG. 3 illustrates a partial plan view of the electronic device in the open configuration, showing several audio driver assemblies disposed between the top case and the bottom case.

FIG. 3 illustrates a partial plan view of the electronic device 100 in the open configuration, showing audio driver assemblies 130 disposed in the base portion 106. For example, the audio driver assemblies 130 may include a first audio driver assembly 132, a second audio driver assembly 134, a third audio driver assembly 136, and a fourth audio driver assembly 138. The audio driver assemblies 130 are designed to generate acoustical energy in the form of audible sound (in the range of human hearing), and may produce sound from an audio file or video file stored on a memory circuit (not shown), as a non-limiting example, in the electronic device 100. As shown, the audio driver assemblies 130 include four audio drivers. However, in other embodiments, the electronic device 100 includes three or less audio driver assemblies, or five or more audio driver assemblies. Also, each of the audio driver assemblies 130 may be disposed in a frame member designed to dissipate heat generated from each the audio driver assembly and allow sound emitted from each of the audio driver assemblies 130 to exit the electronic device 100 via an opening, such as one of the openings 124 (shown in FIG. 2). This will be discussed below.

Figure 4:
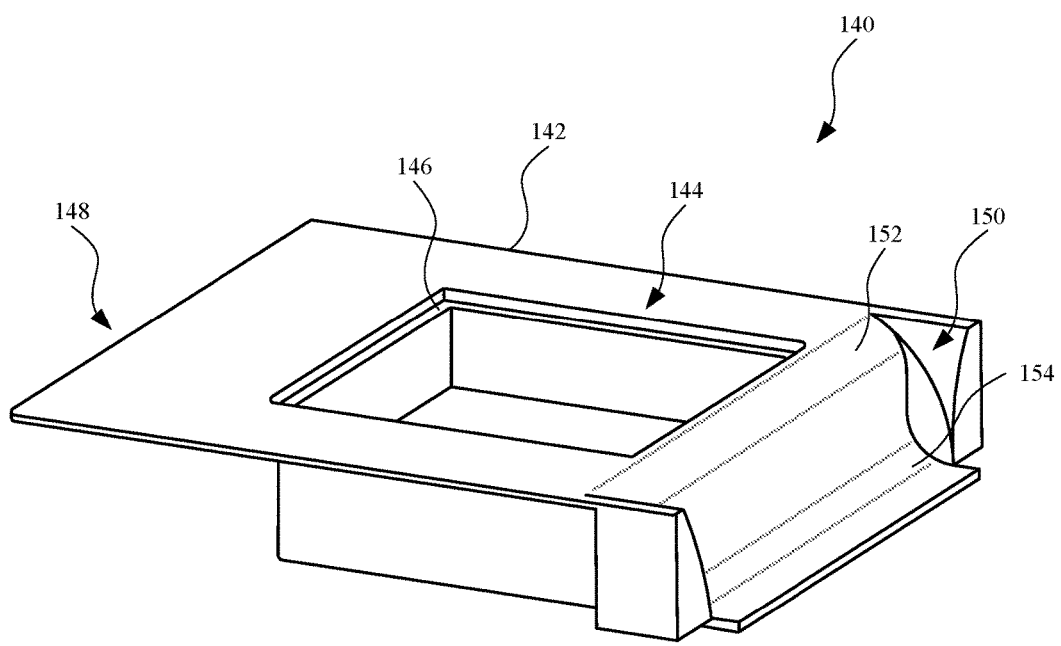
FIG. 4 illustrates an isometric view of an embodiment of a frame member, in accordance with the described embodiments.

FIG. 4 illustrates an isometric view of an embodiment of a frame member 140, in accordance with the described embodiments. The frame member 140 may be referred to as a yoke or housing for an internal component of an electronic device. The frame member 140 may be formed from a substrate 142. In some embodiments, the substrate 142 is formed from a metal having a low magnetic reluctance and relatively high thermal conductivity, such as steel or stainless steel. However, the frame member 140 may be formed from a material or materials generally known in the art to include a similar or greater thermal conductivity, as well as a similar or relatively lower magnetic reluctance. Also, the material makeup of the frame member 140 may allow the frame member 140 to carry and redirect magnetic flux generated by a magnet (not shown). For example, the frame member 140 may redirect magnetic flux from a magnet in an audio driver assembly to a gap or opening in a voice coil of the audio driver assembly.

As shown, the frame member 140 may include a recessed region 144 designed to receive an internal component of an electronic device. For example, the internal component may include an audio driver assembly, such as the first audio driver assembly 132 in the electronic device 100 (shown in FIG. 3). Also, although not shown, the recessed region 144 may include various shapes and sizes to receive other internal components, such as a processor circuit, or audio driver assemblies of various shapes and sizes. Also, the recessed region 144 may include a support member 146 designed to engage the internal component disposed within the recessed region 144. An internal component may adhesively secure with the frame member 140 based on an adhesive disposed on the support member 146.

The frame member 140 may further include a flange member 148 that generally surrounds the recessed region 144. Further, the flange member 148 may include a size and shape, thereby giving the frame member 140 sufficient thermal capacity for additional heat sinking, or heat dissipation, from a component (such as an audio driver assembly) thermally coupled with the frame member 140. Further, the flange member 148 may be designed to engage an internal feature or features of the top case 110 (shown in FIG. 2). This will be shown below. However, in other embodiments, the internal feature or features are located on the bottom case 126 (shown in FIG. 2) and accordingly, the flange member 148 engages those features associated with the bottom case 126. Also, the flange member 148 may transition to a curved region 150. The curved region 150 of the frame member 140 may include a non-linear section (or non-linear sections), such as a first curved section 152 and a second curved section 154. Accordingly, the curved region 150 may be characterized as having one or more non co-planar sections, with these sections being non-coplanar with respect to other features of the frame member 140 previously described. When the frame member 140 is assembled with an enclosure of an electronic device, the curved region 150 may include a size and shape to align with an opening of an electronic device, which may include one or more of the openings 124 (shown in FIG. 2). In this manner, when an audio driver assembly is disposed in the recessed region 144, the curved region 150 may define at least a part of an acoustic duct, or acoustic pathway, for the audio driver assembly. This will be shown and described below.

Also, in some embodiments, the frame member 140 is formed from a metal injection molding process. In other embodiments, the frame member 140 is formed from an extrusion process. In the embodiment shown in FIG. 4, the frame member 140 is formed from a stamping process, which may include a die (not shown) having a size and shape in accordance with one or features of the frame member 140. The various formation techniques allow the features of the frame member 140 (such as the recessed region 144) to be formed from a single piece of material. In this manner, the frame member 140 may not only support acoustic performance of an audio driver assembly, but is also an efficient thermal bridge allowing heat generated from the audio driver assembly (or any internal component thermally coupled with the frame member 140) to dissipate from the audio driver assembly to the enclosure of the electronic device, as the frame member 140 may be formed from a single and continuous substrate that allows heat to flow freely, as compared to a frame member formed from multiple parts. The frame member 140 may therefore allow the audio driver assembly to perform in a consistent and reliable manner due in part to the audio driver maintaining a consistent temperature below a threshold operating temperature of the audio driver assembly.

Figure 5:
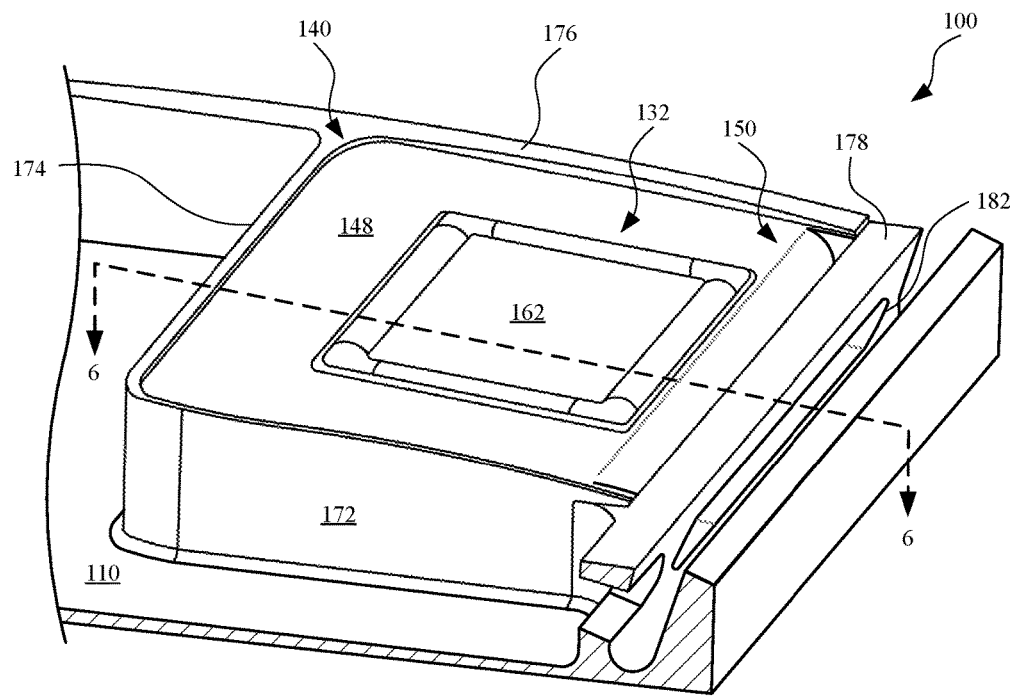
FIG. 5 illustrates an isometric view of a partial interior region of the electronic device, showing the first audio assembly disposed in the frame member, both of which are disposed in the top case.

FIG. 5 illustrates an isometric view of a partial interior region of the electronic device 100, showing the first audio driver assembly 132 disposed in the frame member 140, both of which are disposed in the top case 110. As shown, the first audio driver assembly 132 may include a diaphragm 162 that may be acoustically driven by components of the first audio driver assembly 132 in order to generate acoustical energy in the form of audible sound. The flange member 148 (of the frame member 140) may surround the diaphragm 162. Also, the top case 110 may undergo a material removal process to define several sidewalls such that the top case 110 is formed as unibody configuration with the sidewalls integrally formed with the top case 110. For example, the top case 110 may include a first sidewall 172, a second sidewall 174, and a third sidewall 176, each of which may be designed to receive and/or engage a portion of the flange member 148. With the flange member 148 engaged with at least one of the aforementioned sidewalls, the flange member 148 may thermally couple with the engaged sidewall (or sidewalls). In this manner, the frame member 140, using the flange member 148, may receive thermal energy (heat) generated by the first audio driver assembly 132 and pass the thermally to the top case 110 by way of the sidewalls. In other words, the flange member 148 may act as a thermal bridge. Also, the top case 110 may be formed from a metal and further, may include a size substantially larger than that of the frame member 140. In this manner, the top case 110 may easily absorb thermal energy received from the frame member 140.

In addition, the top case 110 may further include a fourth sidewall 178 that includes an opening 182. The opening 182 may be one of the openings 124 (shown in FIG. 2). Also, as shown in FIG. 5, the curved region 150 of the frame member 140 may be designed to align with the opening 182, thereby allowing the frame member 140 to open to the opening 182. In this manner, the opening 182 may be used not only as a thermal vent for one or more components of the electronic device 100, but also as an opening for an acoustic pathway for the first audio driver assembly 132 to emit acoustical energy from the electronic device 100. However, in some embodiments (not shown), the opening 182 is formed in a structural feature other than the fourth sidewall 178, and the curved region 150 is nonetheless designed to align with the opening 182 in the other structural feature.

Figure 6:
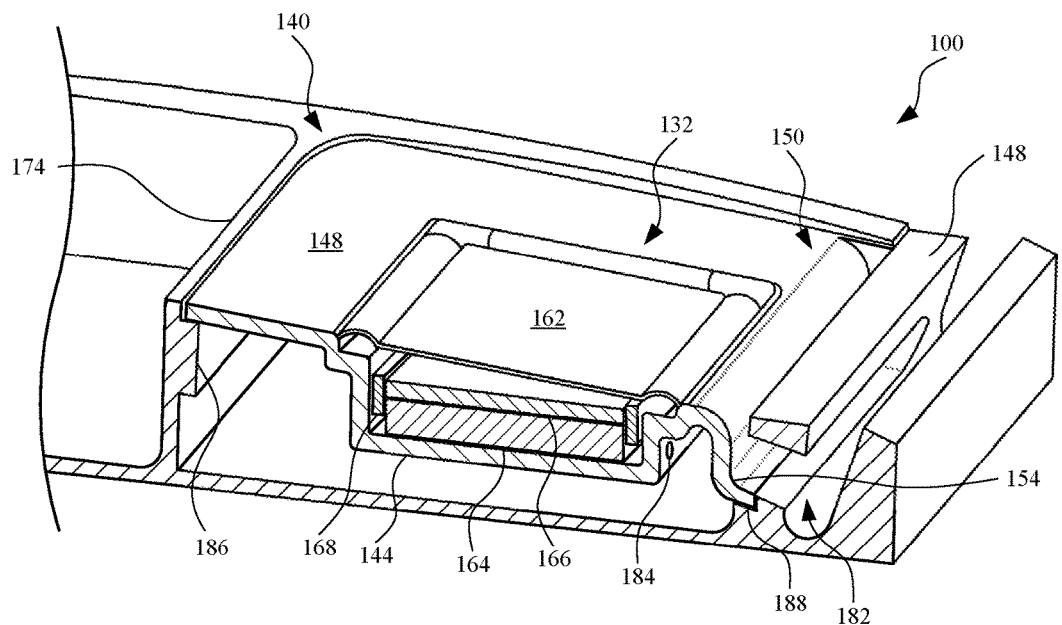
FIG. 6 illustrates an isometric view of the electronic device, showing a partial cross sectional view of the first audio driver assembly and frame member taken along line 6-6 (shown in FIG. 5)

FIG. 6 illustrates an isometric view of the electronic device 100, showing a partial cross sectional view of the first audio driver assembly 132 and frame member 140 taken along line 6-6 (shown in FIG. 5). The first audio driver assembly 132 may include several additional components (in addition to the diaphragm 162), such as a magnet 164, a steel structure 166, and voice coil 168. Also, although not shown, one or more wires may pass through the recessed region 144 and couple with the voice coil 168 to provide electrical current to the voice coil 168, and causing the voice coil 168 to actuate and acoustically drive the diaphragm 162. In some embodiments, the recessed region 144 includes a porthole 184 designed to receive one or more wires. Alternatively, or in combination, the porthole 184 may be designed to relieve pressure within the recessed region 144. Further, in some embodiments, the recessed region 144 includes multiple portholes. This will be shown below.

The steel structure 166 (or alternatively, a different ferromagnetic material) may be designed to redirect or focus magnetic flux generated from the magnet 164 in a desired manner (such as redirecting the magnetic flux away from components sensitive to magnetic flux). Also, during operation of the first audio driver assembly 132, the diaphragm 162 may vibrate to produce acoustical energy, and in turn, cause a change in air pressure and airflow around the diaphragm. The airflow passing along the acoustic pathway, which includes the curved region 150, helps to provide forced convection cooling, thereby acting in a self-cooling capacity. The convective cooling may include dissipating thermal energy absorbed by the frame member 140.

Also, the sidewalls may provide support features for the flange member 148. For example, the second sidewall 174 may include a support member 186 used to receive and/or adhesively secure the frame member 140 with the second sidewall 174. The adhesive (not shown) may include a silver-coated epoxy that increases heat transfer from the frame member 140 to the sidewalls. Additional support members (not shown) may be includes and may provide similar features as those of the support member 186. FIG. 6 further shows the curved region 150 aligned with the opening 182, based in part on the second curved section 154. Also, to further promote the alignment between the curved region 150 and the opening 182, the fourth sidewall 178 may include a notch 188 designed to receive a portion of the curved region 150.

Figure 7:
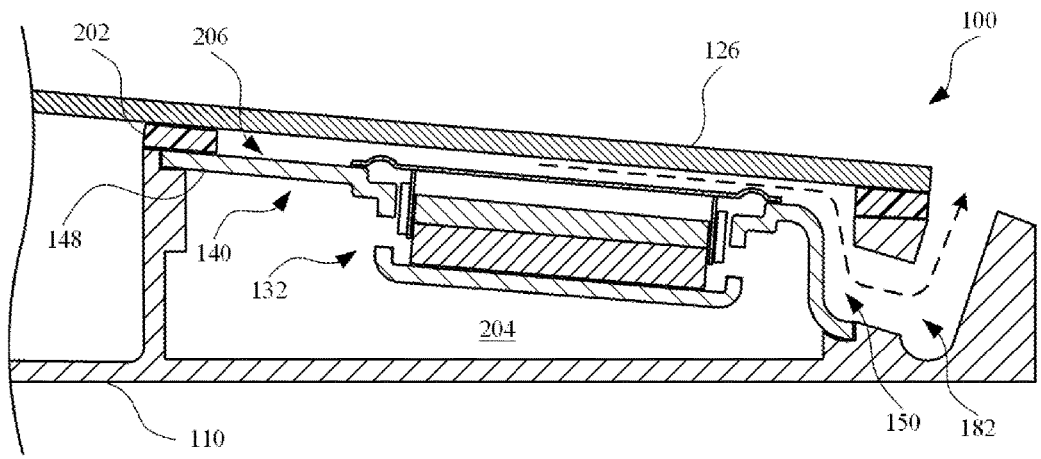
FIG. 7 illustrates a cross sectional view of the electronic device shown in FIGS. 5 and 6, further showing the bottom case assembled with the top case.

FIG. 7 illustrates a cross sectional view of the electronic device 100 shown in FIGS. 5 and 6, further showing the bottom case 126 assembled with the top case 110. An acoustic seal 202 may be disposed between the top case 110 and the bottom case 126, and may be used to channel acoustic energy, or sound, emitted from the first audio driver assembly 132 along a front volume 206 defines as a void or space between the frame member 140 and the bottom case 126. The acoustic seal 202 may be selected from a material (or materials) such as silicone, boron foam, or generally any gasket material used in acoustic sealing applications. In this manner, the acoustic seal 202, the bottom case 126, the frame member 140 (including the curved region 150), and the opening 182 can define the acoustic pathway (denoted as a dotted line) for the first audio driver assembly 132 that leads out of the electronic device 100. FIG. 7 further shows the frame member 140 defining a back volume 204, defined as a space between the frame member 140 and the top case 110. Accordingly, the frame member 140 may a seal between the front volume 206 and the back volume 204 in the electronic device 100, and separate the two volumes.

While the features and components in FIGS. 5-7 are shown and described for a frame member 140 and a first audio driver assembly 132, an electronic device 100 in accordance with the described embodiments may include several audio driver assemblies and associated features (such as frame member, openings, etc.) that may include any features previously described that are associated with the first audio driver assembly 132. Further, the electronic device 100 in accordance with the described embodiments may include a frame member for each audio driver assembly, with the each frame member having any feature (or features) previously described for a frame member 140.

Figure 8:
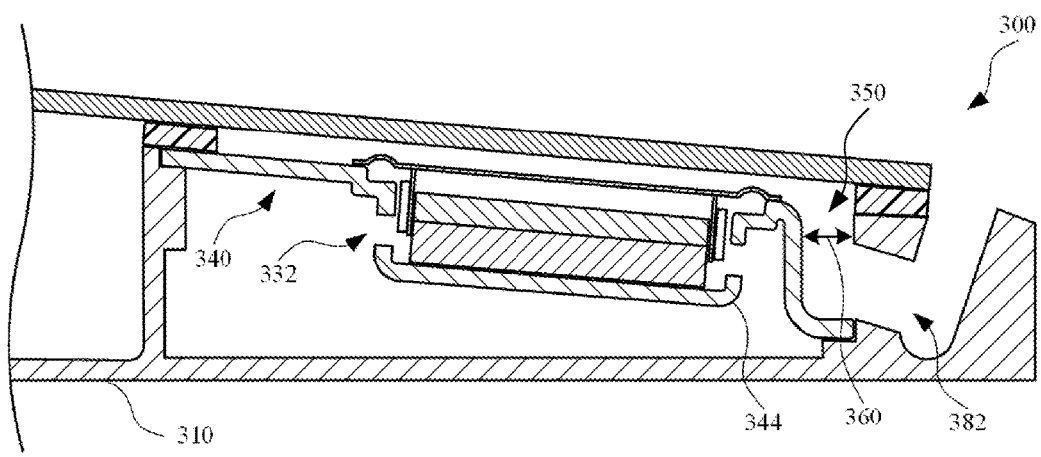
FIG. 8 illustrates a cross sectional view of an alternate embodiment of an electronic device having a frame member with alternate features, in accordance with the described embodiments.

A frame member, in accordance with the described embodiments, may include various modifications used to receive internal components of different shapes and sizes, and/or alter the acoustic pathway. For example, FIG. 8 illustrates a cross sectional view of an alternate embodiment of an electronic device 300 having a frame member 340 with alternate features, in accordance with the described embodiments. The frame member 340 may include a curved region 350 formed closer to the recessed region 344 of the frame member 340, as compared to the curved region 150 (shown in FIG. 7). For example, the curved region 350 may be relatively flat in a location near an opening 382 of the top case 310. This may allow for a larger separation (denoted by the arrows 360) for an acoustic pathway used by an audio driver assembly 332 disposed in the frame member 340.

Figure 9:
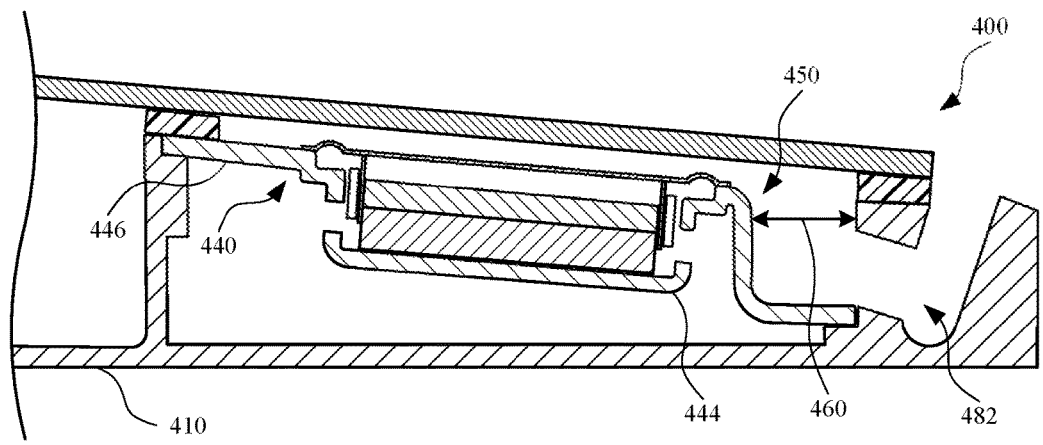
FIG. 9 illustrates a cross sectional view of an additional alternate embodiment of an electronic device having a frame member with alternate features, in accordance with the described embodiments.

FIG. 9 illustrates a cross sectional view of an additional alternate embodiment of an electronic device 400 having a frame member 440 with alternate features, in accordance with the described embodiments. As shown, the frame member 440 may include a flange member 446 having a smaller dimension than flange members previously described (such as the flange member 148 shown in FIG. 7). The relatively smaller dimensions of the flange member 446 may allow for a recessed region 444 and a curved region 450 (both part of the frame member 440) to be positioned further from an opening 482 of the top case 410, thereby forming an even larger space (denoted by the arrows 460) for the acoustical pathway, as compared to the space shown in FIG. 8. It will be appreciated that the frame members shown in FIGS. 8 and 9 may include any material or processes previously described for a frame member.

Figure 10:
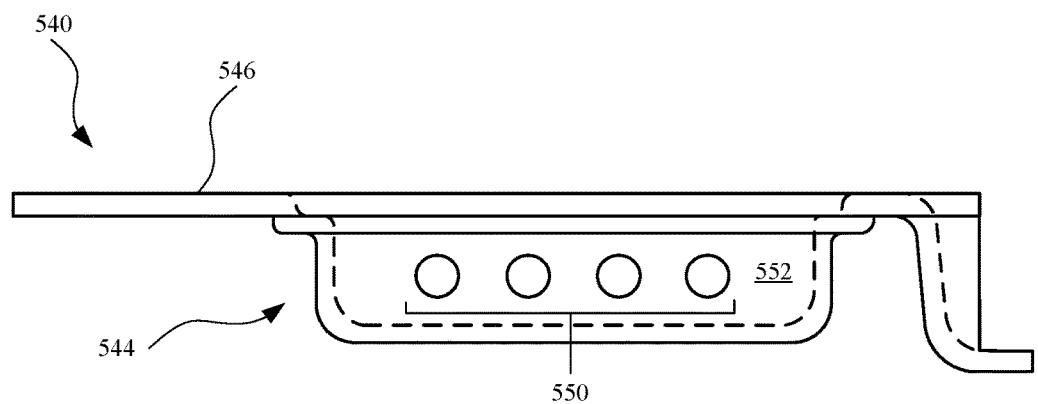
FIG. 10 illustrates a side view of an alternate embodiment of a frame member having a recessed region with portholes, in accordance with the described embodiments.
Figure 11:
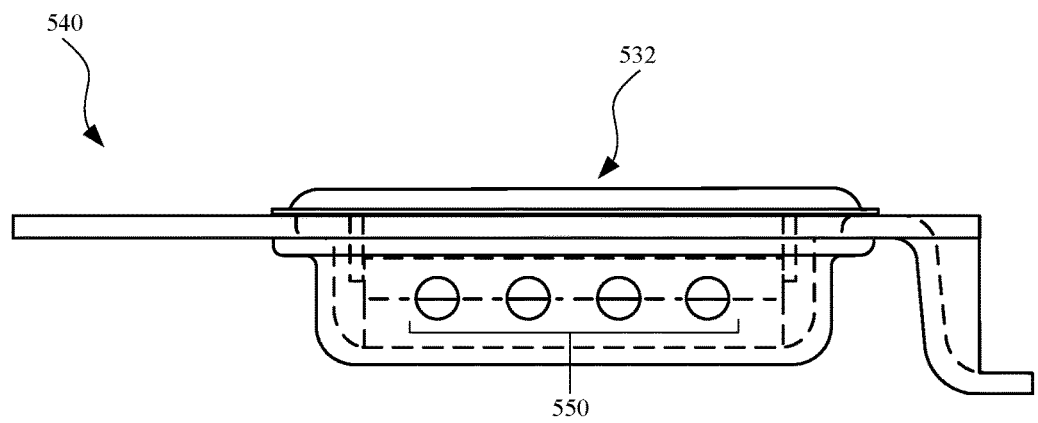
FIG. 11 illustrates a side view of the frame member shown in FIG. 10, further showing an audio driver assembly installed in the frame member.

FIG. 10 illustrates a side view of an alternate embodiment of a frame member 540 having a recessed region 544 with portholes 550, in accordance with the described embodiments. As shown, the portholes 550 are located on a side surface 552 of the recessed region, with the side surface 552 being generally perpendicular with respect to a flange member 546 of the frame member 540. The portholes 550 may be used as a pathway to receive a cable, for example, that electrically couples with a component (or components) of an audio driver assembly (not shown) disposed in the frame member 540. Also, the portholes 550 may further offer a pressure relief for pressure build-up in the recessed region 544 caused by an audio driver assembly. While a discrete number of portholes 550 are shown, the number of portholes 550 may vary. For instance, in some embodiments (not shown), the frame member 540 includes a single porthole. Also, additional portholes may be disposed on additional surfaces of the recessed region 544 other than the side surface 552. FIG. 11 illustrates a side view of the frame member 540 shown in FIG. 10, further showing an audio driver assembly 532 installed in the frame member 540. As shown, the portholes 550 may provide a path for the audio driver assembly 532 to a back volume when the audio driver assembly 532 and the frame member 540 are installed in an electronic device (not shown).

Figure 12:
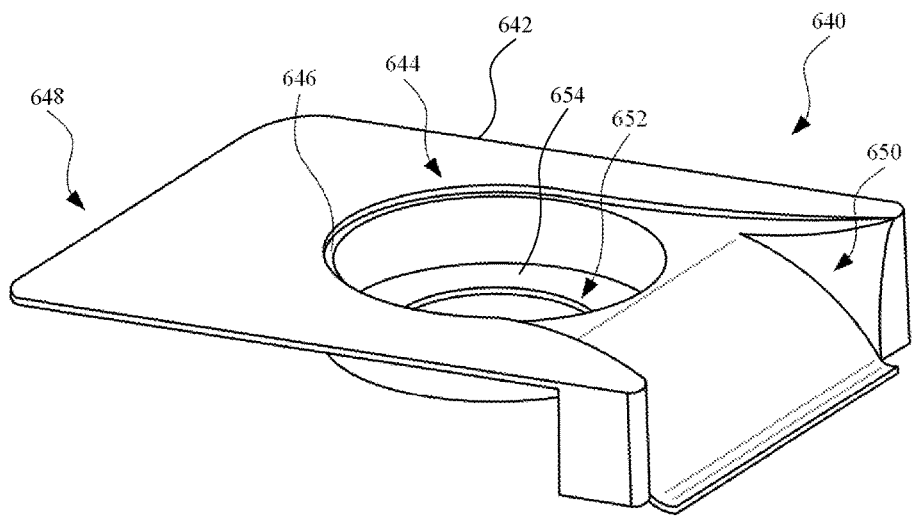
FIG. 12 illustrates an isometric view of a frame member that includes a recessed region having a cylindrical shape, accordance with the described embodiments.

The frame member may include different shapes and sizes to accommodate various components. For example, FIG. 12 illustrates an isometric view of a frame member 640 that includes a recessed region 644 having a cylindrical shape, accordance with the described embodiments. The frame member 640 may be formed from a substrate 642 that may include any material or feature previously described for a substrate. As shown, the frame member 640 may include a recessed region 644 designed to receive an internal component, such as an audio driver assembly (not shown). The cylindrical shape of the recessed region 644 may include a shape corresponding to a cylindrical internal component, such as a cylindrical audio driver assembly (not shown). The frame member 640 may include a support member 646 surrounding (or at least partially surrounding) the recessed region 644, and capable of receiving the audio driver assembly. Also, the frame member 640 may further include a support member 646 generally surrounding the recessed region 644, and designed to provide a thermal bridge to an enclosure (not shown) of an electronic device. Further, the frame member 640 may include a flange member 648 surrounding (or at least partially surrounding) the recessed region 644.

The frame member 640 may further include a curved region 650 having multiple curved sections, with the curved region 650 having a size and shape designed to mate, or align, with an enclosure of an electronic device (not shown), and allow the frame member 640 to open to an opening (not shown) of the enclosure in a manner previously described. Also, the curved region 650 may include a lower angle relative to an imaginary horizontal plane (not shown) below the frame member 640 (as compared to previously embodiments of a curved region). This may offer an enhanced acoustical performance.

As shown in FIG. 12, the recessed region 644 may further include an opening 652 on a bottom surface 654 of the recessed region 644, with the bottom surface 654 being generally parallel with respect to a support member 646 of the frame member 540. The opening 652 may be used to allow sound to pass into a back volume (not shown) defined in part by an enclosure of an electronic device, as well as to align an internal component positioned within the recessed region 644. Regarding the latter, a tool (not shown) may extend through the opening 652 to adjust the internal component and position the component in a desired manner. Alternatively, or in combination, the opening 652 may allow a cable to pass through the recessed region 644 and electrically couple with a component (or components) of an internal component, such as an audio driver assembly, disposed in the recessed region 644.

Figure 13:
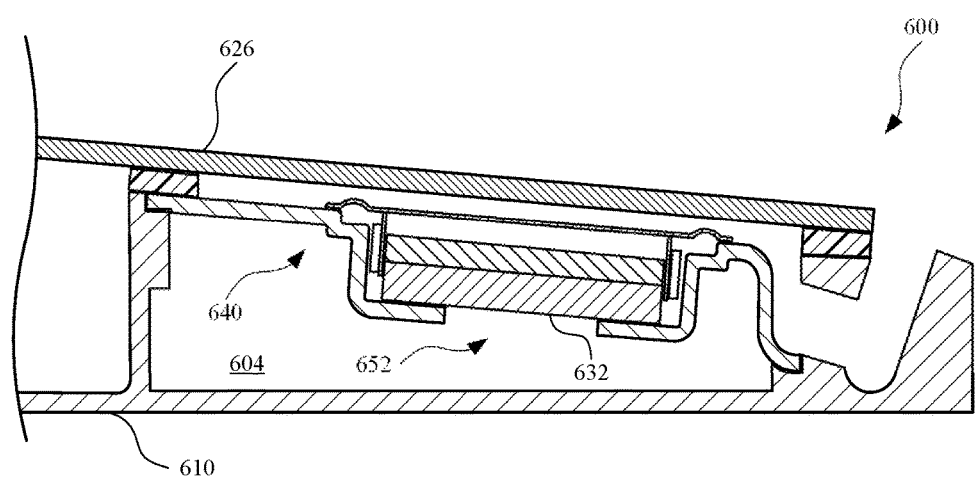
FIG. 13 illustrates a cross sectional view of a cylindrical audio driver assembly disposed in a frame member, with the cylindrical audio driver assembly and the frame member positioned within an enclosure of an electronic device, in accordance with the described embodiments.

FIG. 13 illustrates a cross sectional view of an audio driver assembly 632 disposed in a frame member 640, with the audio driver assembly 632 and the frame member 640 positioned within an enclosure of an electronic device 600, in accordance with the described embodiments. Although a cross sectional view is shown, the audio driver assembly 632 may include a cylindrical shape. The enclosure may be defined by a top case 610 and a bottom case 626, both of which may include any feature or features previously described for a top case and a bottom case, respectively. As shown, the opening 652 may allow the audio driver assembly 632 to pass acoustical energy into a back volume 604 (defined by a void or space between the frame member 640 and the top case 610), which may improve acoustical performance of the audio driver assembly 632.

It will be appreciated that several features may be interchanged among the several embodiments shown and described. For example, the opening 652 (shown in FIGS. 12 and 13) may be included in a frame member 140 (shown in FIG. 4). Alternatively, or in combination, the portholes 550 (shown in FIGS. 10 and 11) may be included in the frame member 640 (shown in FIGS. 12 and 13).

Figure 14:
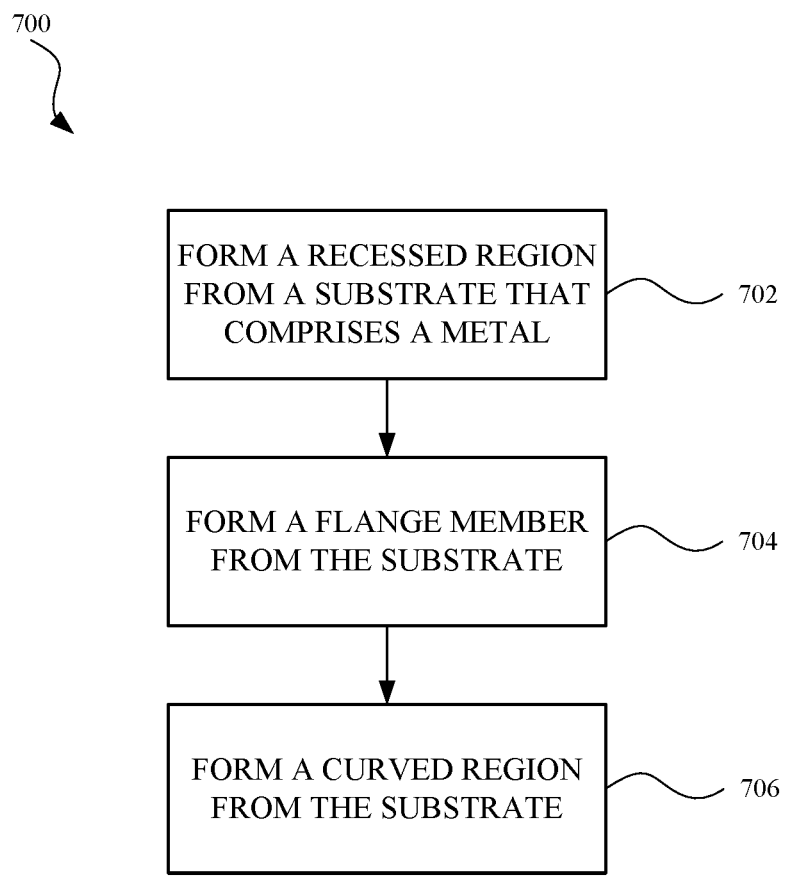
FIG. 14 illustrates a flowchart showing a method for forming an electronic device, in accordance with the described embodiments.

FIG. 14 illustrates a flowchart 700 showing a method for forming a frame member for carrying an internal component positioned in an electronic device that includes an enclosure having an opening, in accordance with the described embodiments. In step 702, a recessed region is formed from a substrate. The substrate may include a metal, which may include a ferromagnetic material. In this manner, the substrate may be designed to redirect magnetic flux from a magnet. The magnet may be part of an audio driver assembly seated in the frame member.

In step 704, a flange member is formed from the substrate. The flange member may extend from recessed region. The flange member may also be configured to engage the enclosure. Further, when the substrate, and in turn, the flange member, is formed from a metal, the substrate allows heat received by the internal component to readily pass through the flange member as the metal substrate may include a relatively high thermal conductivity, and the heat may pass to the enclosure. Also, due in part to the enclosure, such as a top case or a bottom case, being formed from a metal and having a size substantially greater than the substrate that forms the frame member, the enclosure may include sufficient thermal capacity to receive the heat from the flange member, and readily dissipate received from the frame member.

In step 706, a curved region is formed from the substrate. The curved region may extend from the recessed region, and may be configured to align with the opening. In this manner, when the internal component is an audio driver assembly, the curved region may define at least part of an acoustical pathway that enhances the acoustical performance of the audio driver assembly.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An electronic device, comprising:
an enclosure comprising a first wall including a support member and a second wall defining an audio exit opening;
a frame member comprising:
a recessed region positioned between the first and second walls; and
a flange member having a first portion extending from the recessed region and engaging the support member of the first wall, and a second portion having a first curved section extending from the recessed region and curving in a first direction toward a base of the second wall and having a second curved section curving in a second direction to align with the audio exit opening and form a portion of an acoustic pathway, the first direction being different than the second direction; and
a speaker disposed within and supported by the recessed region, the speaker being configured to generate audio waves that travel through the acoustic pathway and exit the enclosure through the audio exit opening.

2. The electronic device of claim 1, wherein the recessed region is formed from a single piece metal substrate that comprises a ferromagnetic material that redirects magnetic flux provided by a magnet of the speaker.

3. The electronic device of claim 1, further comprising a third wall, the first and second walls protruding from the third wall.

4. The electronic device of claim 1, further comprising a display housing coupled with the enclosure and configured to pivot with respect to the enclosure.

5. The electronic device of claim 1, wherein the recessed region comprises a porthole.

6. The electronic device of claim 1, wherein the frame member separates a back volume of the speaker from a front volume of the speaker.

7. An electronic device, comprising:
an enclosure comprising a first wall and a second wall defining an audio exit opening;
an audio driver assembly; and
a frame member defining a thermal bridge configured to dissipate heat generated from the audio driver assembly and pass the heat to the enclosure, the frame member comprising:
a substrate comprising a recessed region carrying the audio driver assembly, and
a flange member formed from the substrate having a first portion extending laterally from the recessed region that is supported by the first wall and a second portion having a first curved section extending from the recessed region and curving in a first direction toward a base of the second wall and having a second curved section curving in a second direction different than the first direction to align with and form an acoustic pathway leading to the audio exit opening.

8. The electronic device of claim 7, wherein the recessed region comprises a support member that receives at least part of the audio driver assembly.

9. The electronic device of claim 7, wherein the audio driver assembly comprises a magnet that generates magnetic flux, and wherein the frame member comprises a ferromagnetic material that redirects the magnetic flux.

10. The electronic device of claim 7, wherein the frame member comprises a porthole through which a cable electrically coupled to the audio driver assembly extends.

11. The electronic device of claim 7, wherein the audio exit opening dissipates heat and allows acoustical energy generated from the audio driver assembly to exit the enclosure.

12. The electronic device of claim 7, wherein the enclosure comprises several sidewalls, and wherein the several sidewalls combine with the frame member to define a back volume for the audio driver assembly.

13. The electronic device of claim 12, wherein the enclosure comprises: a top case that includes the several sidewalls,
a bottom case sealed with the top case, and
the frame member combining with the bottom case to define a front volume for the audio driver assembly, the front volume separated from the back volume by the frame member.

14. An electronic device, comprising:
an enclosure comprising a first wall and a second wall defining an audio exit opening;
an audio driver assembly comprising a magnet and a voice coil; and
a frame member for receiving the audio driver assembly, the frame member comprising a metal substrate that comprises a recessed portion disposed between the first and second walls that carries the audio driver assembly, a first flange portion extending laterally from the recessed portion and supported by the first wall, and a second flange portion having a first curved section extending from the recessed portion and curving in a first direction toward a base of the second wall and having a second curved section curving in a second direction to align with the audio exit opening to define a portion of an acoustic pathway, the first direction being different than the second direction.

15. The electronic device of claim 14, wherein the frame member comprises a flange member that thermally couples with the enclosure.

16. The electronic device of claim 15, wherein the flange member cooperates with the first and second walls to define a back volume for the audio driver assembly.

17. The electronic device of claim 14, wherein:
the electronic device is a laptop, and
the laptop further comprises a plurality of audio driver assemblies, each of the audio driver assemblies configured to emit audio through audio exit openings leading out of the enclosure proximate a pivotal coupling between the enclosure and a display housing.

18. The electronic device of claim 14, wherein the audio driver assembly further comprises a steel structure that combines with the frame member to redirect magnetic flux emitted by the audio driver assembly.

* * * * *